Feb. 15, 1955 J. A. BRUSTMAN ET AL 2,702,380

DATA TRANSLATING SYSTEM

Filed Dec. 24, 1953 2 Sheets-Sheet 1

INVENTORS
Joseph A. Brustman
& Kun Li Chien
BY
Morris A. Rabkin
ATTORNEY

DATA TRANSLATING SYSTEM

Filed Dec. 24, 1953 2 Sheets-Sheet 2

INVENTORS
Joseph A. Brustman
& Kun Li Chien
BY Morris A. Rabkin
ATTORNEY

Jnited States Patent Office 2,702,380

Patented Feb. 15, 1955

2,702,380

DATA TRANSLATING SYSTEM oseph A. Brustman, Narberth, Pa., and Kun Li Chien, Haddonfield, N. J., assignors to Radio Corporation of America, a corporation of Delaware Application December 24, 1953, Serial No. 400,318

18 Claims. (Cl. 340—174)

Figure 1:
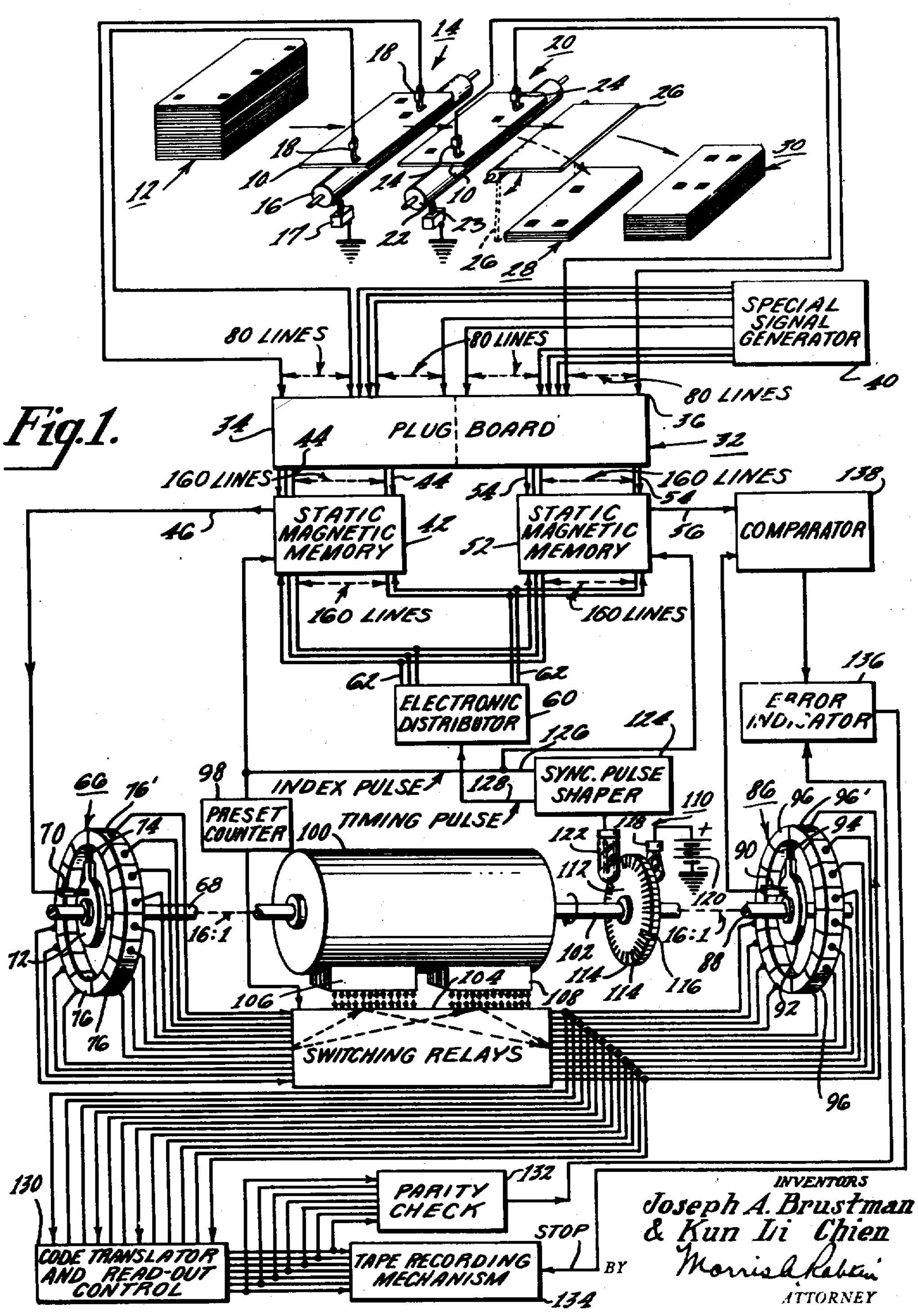

This invention relates to data translating systems. Iore particularly, this invention relates to a system for eading information stored on a first data storage medium, upplementing that information, rearranging the sensed nd supplementary information, verifying the rearranged nformation, converting the verified information into a ifferent code, and recording that information on a secnd data storage medium.

Record cards and record card handling systems are videly known and used in modern commerce for electric ccounting machinery. These cards, sometimes known as Iollerith cards, usually consist of punched record cards f fixed dimension having perforated patterns representng individual characters. In one widely known system, he perforated patterns consist of eighty vertical columns, ivided into twelve horizontal rows. Each vertical olumn represents an individual character, the perforaions being placed in the rows within a column in acordance with a preselected code. By using combinations f two or more perforations, this system may represent lphabetical characters as well as numbers from zero to iine, and the system may also have specific combinations or other, special symbols.

The amount of information on these cards is of necesity limited by the physical structure of the card, since the ize of the card, and the size of the perforations, must be ept within reasonable limits. In practical usage, thereore, card methods of sorting and collating information re subject to inherent restrictions in speed and flexibility.

For this and other reasons, other information handling ystems, having other operative features and advantages, iave come into existence. Prominent examples of such nformation handling systems are the magnetic tape deices which store information, both alphabetic and nuneric, in a digital code. A vast amount of information nay be stored on a tape, and the speed with which this nformation may be manipulated is much greater than hat possible with perforated cards. The code employed vith magnetic tape information handling systems, howver, is different from that employed with perforated ards. Furthermore, the techniques of handling a coninuous tape most advantageously require that separate ogical groupings of information be "packed" as closely n the tape as is feasible. Thus, special symbols are often mployed to designate the beginning and end of words, nessages, and documents. The order in which informaion is disposed on perforated cards is usually dictated by ard techniques, and may not be desirable for magnetic ape recording. If it is desired to utilize information on erforated cards as a basis for a magnetic tape handling ystem, the perforated card information must usually be earranged in some desired fashion.

Because of the commercial acceptance of perforated ards, and because of the many specific advantages to be ained in many applications in using magnetic tape sysems, there exists a need for a system for converting inormation from cards to tape. As stated previously, this ystem must include some means for converting from the erforated card code to the magnetic tape code. The ystem must also, as outlined above, include a practical vay to supplement the data on the cards and to rearange the data so supplemented. As in all commercial intallations, this should be done as economically as is pracicable, although there should still be sufficient flexibility or the basic system to operate with changed coding arangements. Furthermore, any such device for converting cards to tape must operate as rapidly as possible because the greater speed of magnetic tape devices provides greater information handling capacity than perforated card devices. An extremely important additional requirement is based on the fact that all such information handling systems should be as free as possible from error. Therefore, the information which is converted from card to tape must be verified by the simplest means which will give reasonable assurance that the process has been carried out correctly.

Devices are known for performing the general function of converting information on perforated cards to information on some other medium. The mechanical devices which are known for this function, however, are limited in the rapidity at which they can scan the perforated cards. Other devices utilize faster techniques, but these devices are usually intended to operate in some system which does not seek to pack the information on the second storage medium as closely as is practicable. Thus, these systems normally employ special card coding arrangements intended for use in converting information to a magnetic tape medium. This technique does not permit use of the already widely accepted card systems, nor does it utilize to the fullest the advantages of magnetic tape. It will be appreciated that a desirable card to tape conversion system would preserve the invention in such widely used perforated card systems, while yet utilizing all the advantages of magnetic tape.

Accordingly, an object of this invention is to provide an improved system for translating data from a first data storage medium to a second data storage medium, which system has a greater flexibility and is of wider application than those heretofore known.

A further object of this invention is to provide an improved device for converting information recorded on perforated cards, in supplemented and rearranged form, to a continuous storage medium, more rapidly than devices heretofore employed.

Another object of this invention is to provide an improved device for sensing information recorded on perforated cards, supplementing that information with further data, rearranging the sensed and supplementary information, converting the rearranged information to a different code than that first employed, verifying the accuracy of this conversion process, and recording the verified information on a second data storage medium, yet performing these functions rapidly, accurately, and with improved flexibility over the devices of the prior art.

Yet another object of this invention is to provide an improved device, operable with a data translating system, for providing supplementary information to data being transferred.

It is a further object of the invention to provide a novel high-speed system, having a high degree of flexibility, which can, with minimum expenditure of equipment, sense data encoded on perforated cards, supplement and rearrange that data, verify the data, convert it to a code suitable for magnetic tape, and record the data on magnetic tape.

Another object of this invention is to provide an improved data translating system so designed as to minimize comparison problems in converting information from perforated cards to closely packed information on magnetic tape, without requiring particular techniques for coding the information.

In accordance with this invention, all perforations in a horizontal row on a perforated record card are sensed simultaneously. The parallel signals so obtained are supplemented by further signals from a special signal generator, preselected to provide desired characters, numbers, and special symbols. All these parallel signals are then directed to a plugboard, at which the paths in which the signals flow are rearranged. The signals in the rearranged paths, representing digits for a given row on the record card, are then put in parallel in a static magnetic memory. The static magnetic memory is read serially, so that the signals are converted to pulses varying sequentially with time. The serial train of pulses for each row on the statistical card are commutated to a different channel on a magnetic drum. At the magnetic drum, the serial trains are juxtaposed so that all the digits of each character are again arranged in parallel. The perforated card is sensed a second time, row by row, at a second sensing station. The information represented by the signals resulting from the perforations, is then again supplemented, rearranged, and stored. The information is again read out from the second store, this time in synchronism with the information read out of the corresponding stored row on the magnetic drum. The two serial trains of pulses, co-existing in time, are compared in a comparator device and error is indicated if any discrepancy exists. Simultaneously with this comparison process, all the stored rows of information on the magnetic drum are read in parallel. Since the digits of the characters are stored in parallel, the characters are read individually, still in the perforated card code. These parallel signals are converted to the desired code employed in tte magnetic tape system, and are then recorded on magnetic tape.

According to further features of the invention, the perforated cards move continuously during the reading and verification processes. Each cycle of operation includes a delay period during which cards move into position. As a card which has been sensed once is sensed again for vertification, the next succeeding card is sensed for the first time.

Figure 2:
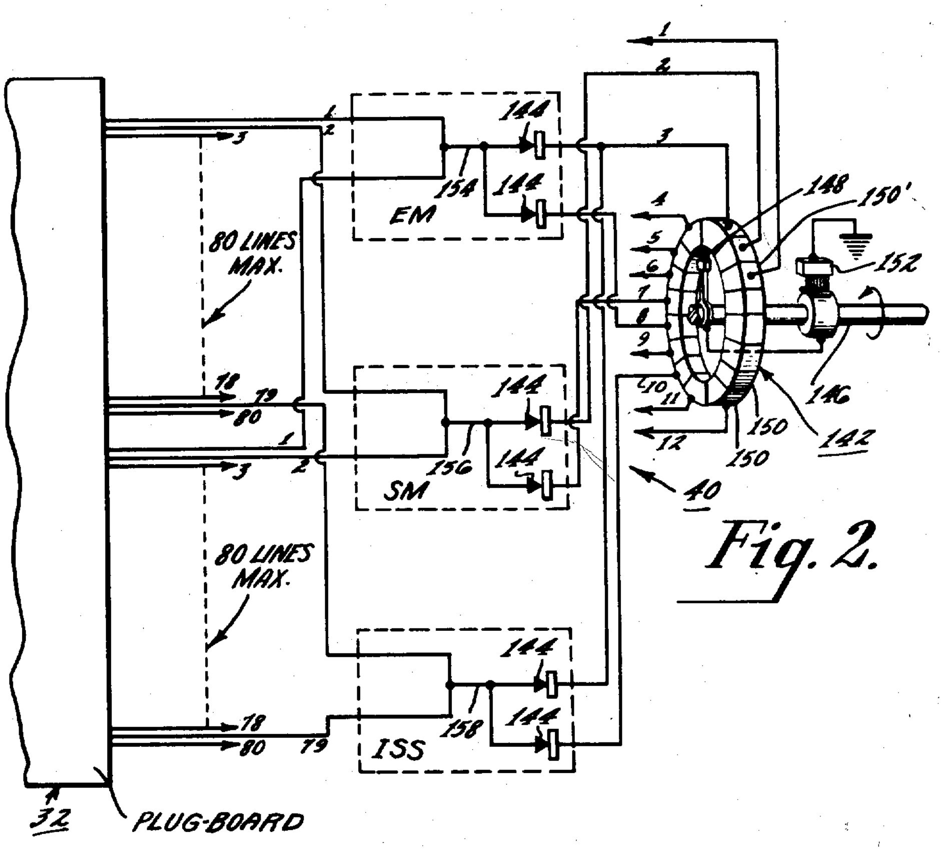

The novel features of this invention, as well as the invention itself, both as to its organization and method of operation, will best be understood from the following description, when read in connection with the accompanying drawings, in which like reference numerals refer to like parts, and in which Fig. 1 is a schematic diagram, partially in perspective and partially in block form, of an embodiment of the invention; and Fig. 2 is a schematic diagram of a special signal generator for use in practicing the invention.

A system for practicing the invention is shown in Fig. 1. Referring now to Fig. 1, perforated statistical record cards 10 are fed in the direction indicated by arrows. The cards 10 here illustrated are assumed to be punched in the previously mentioned twelve position code. The cards 10 are further assumed to have eighty character columns disposed along the length of the card, each column consisting of twelve digital perforation positions arranged in parallel rows from the top to the bottom of the card. It will be apparent, however, that the invention may be practiced with other widely known card systems using different coding schemes. The cards 10 are moved normal to their length from a feed stack 12 to, successively, a first sensing station 14 and a second sensing station 20. From the second sensing station 20, the cards 10 move past a rotatable guide plate 26 to one or the other of two collecting hoppers (not shown) in which stacks 28 and 30 are collected. The two stacks are here termed the error card and correct card stacks, 28 and 30 respectively. The rotatable guide plate 26 may be moved from a horizontal to a vertical position. When the plate 26 is horizontal the cards 10 move to the furthest, or correct, card stack 30. When the plate 26 is vertical, cards drop into the nearest, or error card stack 28.

The motion of each card 10 from the feed stack 12 to the collecting stacks 28 or 30 is continuous and is synchronized with certain rates of rotation in the system. The cards 10 are not processed separately, but with a spacing between them equal to four rows of perforations. The sensing stations 14, 20 are spaced such that when a first card has reached the second sensing station 20 the following card is at the corresponding position at the first sensing station 14. The structures employed for providing this motion and the synchronized card feed are not shown, since structures suitable for this purpose are well known in the art. The rotatable guide plate 26 is an illustration only of a sorting device which may be responsive to error signals in the system for separating cards which have been correctly translated from those which have not.

The first sensing station 14 comprises a rotatable, conductive roller 16 which is connected to a common conductor (indicated by a conventional ground symbol) by brushes 17 which ride against the roller 16. Eighty sensing brushes 18, of which only two have been shown in detail, are disposed along the longitudinal axis of the conductive roller. The remaining brushes are placed intermediate the two shown, and are on the same axis. Each sensing brush 18 is aligned with a vertical column position on the perforated card 10 as the card 10 is fed past the roller 16. When the position at a given column and row which is under a brush 18 is a perforated position, the sensing brush 18 completes a circuit with the conductive roller 16. The second sensing station 20 is like the first, having a rotatable conductive roller 22 which is grounded through coupled contact brushes 23, and eighty axially disposed sensing brushes 24, of which only the end two are shown. The second sensing station 20 operates as does the first.

Each of the eighty sensing brushes 18 from the first sensing station 14 is connected to the left hand side 34 of a two-section plugboard 32, and each of the sensing brushes 24 from the second sensing station 20 is connected to the right hand side 36 of the plug board 32. A special signal generator 40, which may be of the type shown in Fig. 2, has eighty output lines. These lines are broken into two parallel groups of eighty lines each. The lines of one of these groups are connected into the left hand side 34 of the plugboard 32, and the lines of the other are connected into the right hand side 36 of the plugboard 32. The description of the special signal generator 40 will follow this description of the general system of Fig. 1.

At the plugboard 32, the input connections to each section consist of eighty connections from the individual sets of sensing brushes 18, 24, and eighty connections from the special signal generator 40. These connections, which constitute signal paths, may be rearranged into any desired order. The two groups of 160 output lines from the plugboard 32, one group from the left hand side 34 and one group from the right hand side 36, are connected to the parallel input lines 44, 54 of a first and second static magnetic memory 42, 52, respectively. Each of these static magnetic memories 42, 52 has 160 storage cores in parallel, each core being responsive to signals in an individual one of the parallel input lines 44 or 54 to the storage. An electronic distributor 60 coupled to each static magnetic memory 42 or 52 has 160 output channels 62. These channels 62 are further divided into two like groups of 160 lines, each group being associated with one static magnetic memory 42 or 52. The lines of each group are coupled to individual cores in one of the memories. This arrangement of two static magnetic memories 42, 52 and an electronic distributor 60 provides parallel reading and storage of signals on each 160 lines from the plugboard 32, and subsequent serial read-out of the stored signals. Such an arrangement is shown and described in greater detail (see Fig. 3 particularly) in a copending application for patent, Serial No. 394,785, entitled "Static Magnetic Memory," filed November 27, 1953, by Kun Li Chien, and assigned to the same assignee as the present invention. Each core of a set of 160 storage cores is wound with an input coil coupled to an output line from the plugboard. A binary-representative signal on a line is stored as a direction of magnetism in the associated core. A set of sequencing cores is provided, and each of the storage cores is coupled between successive pairs of these sequencing cores. When the storage cores have been driven to their desired binary conditions, a series of timing pulses is passed along the sequencing cores. The timing pulses cause sequential read-out on an output terminal 46 or 56 of the information on each set of storage cores.

The output 46 of the first static magnetic memory 42 is coupled through a contact brush 70 to a common conductor input 72 of a first sixteen segment commutator 66. An inner brush 74 mounted on the common conductor 72 rides against the inside of the commutator segments 76. The inner brush 74 rotates with the common conductor 72, which is mounted on a first commutator shaft 68 having a substantially constant rate of rotation. The first commutator shaft 68 is coupled by gearings or suitable drives (not shown) to a drum shaft 102 having a rotation rate sixteen times faster than that of the first commutator shaft 68. The card feed mechanism is also coupled to the drum shaft 102 to provide a synchronous card movement. A magnetic drum 100 is mounted on the drum shaft 102. Also coupled through gearings or suitable drives (not shown) to the drum shaft 102 is a second commutator shaft 88 which rotates at a speed 1/16 that of the drum shaft 102. A second sixteen segment commutator 86 is concentric with the second commutator shaft 88. Again, a common conductor 92 mounted on the second commutator shaft 88, carries an inner brush 96 which rides against the inside of the commutator segments 96.

Only twelve of the sixteen commutator segments 76 of the first commutator 66 have output leads, the other four segments being grouped together for a purpose to be hereinafter described. The output leads from the first commutator 66 are coupled to twelve separate inputs of a switching relay device 104 having a plurality of relay contacts. The switching relay device 104 has twelve outputs, each coupled to an individual segment 96 of the second commutator 86. The second commutator 86 has four idle segments disposed in the same fashion and at the same relative positions as the first commutator 66.

Coupled to the switching relays 104 and operatively associated with the magnetic drum 100 are first and second twelve channel translating heads 106 and 108. These heads 106, 108, together with the magnetic drum 100, provide recording and play-back of signals as desired. The arrangements are here collectively termed the first and second sides of the drum, respectively. The functioning of such a synchronous recording system is well known and need not be further described here.

The twelve leads from the first commutator 66 provide a twelve channel input to the switching relays 104, while the twelve connections to the second commutator 86 provide a twelve channel output. The function of the switching relays 104 is to couple these inputs and outputs to the first and second sides 106, 108 of the drum 100 so that: (1) a first input program may be recorded on one selected side of the drum 100, (2) a second input program may be recorded on the other side of the drum 100 while the first input program may be played back, and (3) the alternating sequence of recording and play back may be continued indefinitely. The switching relay device 104 must therefore provide a simple alternate switching action. It does so in response to control signals, derived here from a preset counter 98.

Numerous electro-mechanical and electronic devices are known which will provide this function, and therefore a detailed description has been omitted here. By way of example, however, the switching relays 104 might comprise a bistable multivibrator responsive to the preset counter and operating to switch ganged relays with each reversal of steady state multivibrator conditions.

An opaque indexing wheel 112 is mounted on the drum shaft 102 parallel to the drum 100. The indexing wheel 112 has 160 narrow radial slots 114, and one wide radial slot 116 in its outer periphery. A light 118, continuously energized by a D.-C. power source 120, is positioned on one side of the opaque indexing wheel 112 opposite the radial slits in the periphery of the wheel 112. A photoelectric cell 122 is mounted on the opposite side of the wheel 112 so as to be responsive to illumination through the slits 114 and 116. The photoelectric cell 122 is coupled to a device 124 here termed a "synchronizing pulse shaper." This pulse shaper 124 distinguishes the index pulse of long duration which occurs once in a cycle due to the wide index slit 116, from the 160 shorter, timing pulses in the cycle which are caused by the narrower timing slits 114. Also, the pulse shaper 124 provides square shaped outputs suitable for subsequent use. Again, as with the card handling mechanism and magnetic drum storage devices, structures for performing these functions are well known and need not be described in detail. A monostable multivibrator, for example, would provide the pulse shaping function, while an integrating circuit would distinguish between pulses of long and short duration. The pulse originating and shaping circuits may together be called a "timing pulse generator" 110.

The index pulse output 126 of the pulse shaper 124 is coupled to the input of a preset counter 98 and to the read-in inputs of the first and second static magnetic memories 42 and 52. The preset counter 98, mentioned before as providing control signals to the switching relay device 104, may here be a cascaded binary counter of four stages. Such a counter produces an output pulse for each sixteen index pulses applied to it. The timing pulse output 128 of the synchronizing pulse shaper 124 is coupled to the input of the electronic distributor 60.

Each of the twelve output channels of the switching relay device 104 is coupled to an individual input of a code translator 130. Such devices are well known to those skilled in the art. In such a code translator 130, activation of a certain combination of input lines, here 1 or 2 of twelve, provides a coded combination, here in the binary code, on a variable number of outputs. The code translator here employed may have a seven channel output, each of which outputs is coupled to one input of a parity checking device 132. Coupled to the code translator 130, and included with it, is a read-out control which selects the first train of information from an operating cycle.

An example of an appropriate parity checking system 132 is fully shown and described in a co-pending application for patent filed by L. C. Hobbs, Serial No. 317,877, filed October 31, 1952, entitled "Parity Check System" and assigned to the same assignee as the present invention. The binary coded output of the code translator 130 includes a "parity" digit for each character. The parity digit for each character is such that the total number of binary ones in a character is always even (or odd, if so desired). The parity checker 132 ascertains that this condition exists for each binary coded character, and provides an output when the condition does not exist.

The output of the code translator 130 is also coupled to a tape recording mechanism 134, the details and operation of which are well known and not further described here. A conventional error indicator 136 is provided, the output of which provides a signal to stop the tape recording mechanism 134 when an error is detected. The error indicator 136 is coupled to the output of the parity checker 132 and to the output of a comparator device 138. The comparator 138 has two inputs, one of which is connected to the output 56 of the second static magnetic memory 52, and the other of which is coupled through a contact brush 90 to the common conductor 92 of the second commutator 86. The function of the comparator 138, examples of which are well known, is to compare the serial trains of pulses from the second static magnetic memory 52 and the second commutator 86.

The special signal generator 40 (see Fig. 2) provides character digital signals similar to, and supplementary to, the signals resulting from the row by row sensing of the perforated cards. The special signal generator 40 comprises generally a sixteen segment commutator 142 and coupled rectifying elements 144, which are here called buffering diodes. It has been assumed here that a maximum of eighty characters are to be added to the maximum of eighty characters on the type of perforated card which is employed.

The sixteen segment commutator 142 includes a rotatable commutator shaft 146 coupled by suitable drives (not shown) to the drum shaft (not shown in Fig. 2), and rotating at 1/16 the drum shaft speed. An inner brush 148 mounted on the commutator shaft 146 rides against the inside of the commutator segments 150. The inner brush 148 acts as a common conductor, being coupled through contact brushes 152 to ground. Only twelve of the sixteen commutator segments 150 have output leads. The four idle segments are grouped together and correspond in position and function to the idle segments on the first and second commutators (not shown in Fig. 2). The output leads from the various segments 150 have been numbered in order, by way of illustration only, to show how desired signals are provided in the two groups of eighty input channels (here numbered successively) to the plugboard 32.

By way of illustration, the arrangement is shown used for: (1) generating an end message (EM) signal in channel 1, (2) generating a start message (SM) signal in channel 2, and (3) generating an item separation signal (ISS) in channel 79. An EM character has been assumed, arbitrarily, to correspond to positions 3 and 8 in the perforated card code, while an SM character has been assumed to correspond to positions 2 and 7, and an ISS character has been assumed to correspond to positions 3 and 10. The arrangement of connections and buffering diodes 144 for each character has been grouped into a separate block. The circuits each have a common junction point 154, 156, 158 between the two leads from the commutator segments 150 and the two connections to the plugboard 32. Thus, channel 1 of each half of the plugboard 32 is coupled to the common EM junction point 154, and the same junction point 154 is connected to the number 3 and 8 leads from the corresponding commutator segments 150. Buffering diodes 144 are positioned in these lines to prevent erroneous current flow. The SM and ISS character connections follow the same general pattern in coupling the desired points, as shown.

The operation of the special signal generator 40 will be described in conjunction with the operation of the general system. It should be noted here, however, that the flow of information in this device is from commutator 142 to plugboard 32, while the flow of current, with positive signals, is in the opposite direction.

The operation of this system (see Fig. 1) initiates with the feeding of a first perforated card 10 from the feed stack 12 to the first sensing station 14. The conditions which are established prior to the first sensing are: (1) the special signal generator 40 is set to establish the desired code in the desired channels, (2) the connections at each section 34 or 36 of the plugboard 32 are rearranged in a desired order, (3) the drum shaft 102 and coupled commutator shafts 66, 86 are driven at a desired speed, and (4) the cards 10 are fed at a rate synchronized to that of the drum shaft 102. Drum recording techniques usually employ high rates of rotation, so that the drum 100 speed rotation employed here is 6400 R. P. M., making the rotations of the coupled first, second, and special signal generator commutator shafts 66, 86, and 146 (Fig. 2), respectively, 400 R. P. M.

As the first card 10 moves across the first sensing station 14, the first row of digital perforation positions comes into registry between the sensing brushes 18 and the conductive roller 16. Wherever a brush 18 finds a perforation, that brush completes a conductive path. Reading pulses in these conductive paths do not originate at the sensing mechanism 14, but at the synchronizing pulse shaper 124. It is to be noted here that the arrows on Fig. 1 from the sensing stations 14, 20 and the special signal generator 40 to the static magnetic memories 42, 52, represent information flow, and that current flow is in the opposite direction to ground. The index pulse from the pulse shaper 124 is provided to each of the storage cores in both the first and second static magnetic memories 42 and 52. The index pulse turns over only those cores which are associated with a conductive path at the sensing mechanism 14, or with a conductive path in the special signal generator 40. Thus, selected ones of the 160 cores in the first static magnetic memory 42 are turned over at the same time in response to this reading action. Signals are also stored on the second static magnetic memory 52 but these do not affect the operation of the system, as will be apparent later.

The order in which the digital values on a card 10 and on the special signal generator 40 are stored in the first static magnetic memory 42 is the desired order for subsequent magnetic recording on tape. This is accomplished, more specifically, as follows: A signal from the synchronizing pulse shaper 124 which finds a conductive path in a perforated card position goes through, first, the static magnetic memory 42, then through the rearranging plugboard 32, the sensing brush 18 and the conductive roller 16 to ground. The path of this signal with respect to the other parallel paths is altered as desired at the plugboard 32. A signal from the synchronizing pulse shaper 124 which finds a conductive path to ground in the special signal generator 40, (as it flows opposite to the arrows indicating information flow) may be recorded relative to other signals in the same manner. The operation of the special signal generator 40 (see Fig. 2) in creating signals is, however, quite different. When the first row of perforations is under the sensing brushes at the first sensing station, the inner brush 148 on the commutator 142 rides against the first commutator segment 150′ after the four idle segments. A conductive path is thereby created between the synchronizing pulse shaper (not shown in Fig. 2) and ground (since the first commutator segment 150′ is then coupled to ground) wherever a lead in the plugboard 32 is coupled to the first commutator segment 150′. In the example of Fig. 2, no special signal is generated at the first row of perforations. At the second commutator segment, however, the channel numbered 2 from each half of the plugboard 32 is coupled, through the buffering diodes 144 and the commutator 142, to ground.

Important to the operation of this system is the synchronized relation between the rate of card 10 feed and the rate of drum 100 rotation. The drum 100 rotates once for each movement of one perforation row of the cards 10 under the sensing brushes 18 or 24. The commutator shafts 68, 88, including the special signal generator commutator shaft 146 (Fig. 2), rotate only one increment in this time. At the completion of the sensing of twelve card 10 rows, therefore, the magnetic drum 100 has turned twelve times, and the commutators 66, 86, (Fig. 1) and 142 (Fig. 2) have moved through twelve segments. The card 10 has therefore been fully sensed, and a new card may be fed-in. The four idle segments on each commutator are provided for this feed-in purpose. By maintaining a distance equal to four perforations between successive cards 10, each reading and storage cycle includes the time necessary for handling cards 10.

To continue the sequence of handling the first row of perforations on the first card 10 (see Fig. 1), it should be recalled that the sensed and added digital values have been stored in a rearranged order on the parallel cores in the first static magnetic memory 42. The index pulse used to read in this information is followed by a series of 160 timing pulses each of which is distributed by the electronic distributor 60 to a different channel of the static magnetic memory 42. The distributed pulses cause the stored information on the parallel cores to be read out in a serial train on the output line 46. The readout is accomplished during a movement of one row of digital perforation positons, in which time the magnetic drum 100 rotates once and the first commutator shaft 68 moves across one commutator segment 76. This commutator segment, for the first row, is the first segment 76′ encountered after the idle segments. The serial train of pulses thus flows through the common conductor 72 on the first commutator 66, the inner brush 74, and the first commutator segment 76′ to the output channel connected to the first commutator segment 76′.

Each of the output channels of the first commutator 66 is coupled through the switching relay device 104 to a corresponding translating head on one side (here arbitrarily assumed to be the first side 106) of the synchronous magnetic drum 100. At the same time, each translating head on the other (second) side 108 of the drum 100 is coupled to an individual one of the commutator segments 96 on the second commutator 86. As a consequence, the first serial train of pulses from the first static magnetic memory 42 are recorded by one channel on the first side 106 of the magnetic drum 100. Nothing is read out from the second side 108 because, this being the first card, nothing was previously written on the second side 108 of the drum 100. The second serial train of pulses following the first is then recorded on the first side 106 of the drum 100 in the channel next to that already having a recording, because the first commutator 66 has then moved to the adjacent commutator segment.

The second train of pulses is placed with spatial precision along the first because, as pointed out previously, read-out from the static magnetic memory 42 is timed by the timing pulse generator 110, which is directly coupled to the magnetic drum 100. This is also true of the subsequent trains of pulses, which are recorded in successive channels until the twelfth channel has been reached. The magnetic drum 100 then has twelve serial trains of pulses in parallel, and it is to be noted that each twelve parallel positions again present characters in the perforated card code. When the twelfth channel has been reached, the commutator 66, 86 are at the four idle segments 76, 96 and a second card is at the first sensing station 14 while the first card moves to the second sensing station 20. When the sixteenth revolution of the magnetic drum 100 has been completed, the commutators 66, 86 are again at the first segment 76′, 96′, the cards 10 are at the new sensing positions, and the preset counter 98 provides an output which reverses the arrangement of the switching relays 104. That is to say, the channels from the first commutator 66 are now coupled to the translating heads at the second side 108 of the drum 100 for recording, while the translating heads on the first side 106 are now coupled to the channels of the second commutator 86 for play back.

As the second card information is recorded in the same manner as previously described on the second side 108 of the magnetic drum 100, the first card is sensed a second time and the information from the card is compared with signals reproduced from the magnetic drum 100. The comparison is made, row by row, between the serial trains of supplemented and rearranged signals from (1) the second static magnetic memory 52 and (2) the stored rows on the first side 106 of the magnetic drum 100. The rows are compared in order because, as the rows are being read successively from the second static magnetic memory 52, the second commutator 86 is coupled to each corresponding channel of the drum 100 in order. The timing of the two trains of pulses coincides because the position of the magnetic drum 100 is used as a reference for both. This is done by the indexing pulse from the timing pulse generator 110, which initiates read-out from a static magnetic memory 42 or 52 at the same point in each cycle of rotation. It is to be noted that comparison problems are vastly simplified when, as here, only two signals are compared at a time.

The outputs of all stored channels are fed to the code translator 130 simultaneously as the individual rows are being compared. The read-out control coupled to the code translator 130 shuts off the code translator 130 after one revolution of the magnetic drum 100. Although eleven more revolutions are completed, the information signals in the channels are merely repetitions of the first. The code translator 130 provides a seven channel output, as in a seven digit binary code, which is recorded on tape by the tape recording mechanism 134. Any indication of error, as by an inequality at the comparator 138, or an incorrect reading at the parity checker 132, activates the error indicator 136 and, in the illustrated device, stops the system. Provision may also be made for separating the cards 10, by the rotatable guide plate 26 into the correct and error stacks 30 and 28, or for indicating error on the tape itself.

Thus, there has been described a novel and efficient system for reading record cards, supplementing and rearranging the information thereon, converting the supplemented and rearranged information to a different code, and recording the information on magnetic tape. The system provides a simple and rapid method of verification of this translation process, and utilizes a minimum of equipment. It will be apparent to those skilled in the art that the several features of the invention provide numerous advantages independently as well as in combination. Thus, where it is not desired to verify information, the system provides a technique and structure for rapidly supplementing and rearranging data on punched cards. Likewise, the system provides a simple means for verification which is independent of the information supplementing and rearranging features. High speeds are possible because of the electronic switching and storage techniques employed and because of the coordinated action of the commutating devices, the storage devices, and the card feeding mechanism.

What is claimed is:

1. A system for translating characters having a plurality of digital positions from a first data storage medium to a second data storage medium comprising means for sensing like digital positions of said characters to provide character digital signals in parallel, static memory means responsive to said sensing means for storing a digital position of said digital character signals in parallel, a synchronous means for storing signals, means coupled to said synchronous storage means and said static memory means for reading out serially said signals stored in parallel, means coupled to said serial read-out means for recording said serial signals on said synchronous storage means with the digits of an individual character grouped in parallel, means coupled to said synchronous storage means for playing back said characters stored in parallel, code conversion means coupled to said play back means, and means coupled to said code conversion means for recording on said second data storage medium.

2. A system for translating characters having a plurality of digital positions from a first data storage medium to a second data storage medium comprising means for sensing like digital positions of said characters to provide character digital signals in parallel, means coupled to said sensing means for adding character digital signals to said sensed character digital signals, like digital positions of the added characters being in parallel with like digital positions of said sensed characters, means for rearranging the order of said parallel sensed and added character digital signals, static memory means coupled to said rearranging means for storing a digital position of said digital character signals in parallel, a synchronous means for storing signals, means coupled to said synchronous storage means and said static memory means for reading out serially said signals stored in parallel, means coupled to said serial read-out means for recording said serial signals on said synchronous storage means with the digits of an individual character grouped in parallel, means coupled to said synchronous storage means for playing back said characters stored in parallel, code conversion means coupled to said play back means, and means coupled to said code conversion means for recording on said second data storage medium.

3. A system for (1) sensing data encoded in a coordinate array of digital perforation positions on a record card wherein individual positions in a first coordinate direction denote individual characters and individual positions in a second coordinate direction denote like digital positions of said individual characters, (2) adding further characters to the sensed data, (3) rearranging the order of the sensed data and added characters, (4) converting the rearranged data to a binary code, and (5) recording the converted data on a magnetic medium, said system comprising a sensing device for simultaneously sensing like digital perforations of said individual characters, a first commutating means coupled to said sensing device for selecting digital positions corresponding to the digital perforation positions of said individual characters, rectifying means coupled to said first commutating means at the digital positions selected for selectively supplying signals corresponding to digital values of preselected characters, a plugboard rearranging means coupled to said sensing device and said rectifying means, a static magnetic memory means coupled to said rearranging means and responsive through said rearranging means to the sensed perforations at said sensing device and to the signals from said rectifying means, a rotatable magnetic drum storage device, recording and play back means having a plurality of common channels operatively associated with said drum storage device, pulse generator means coupled to said drum storage device for providing a plurality of timing pulses and an index pulse, an index pulse selector responsive to said pulse generating means, said index pulse selector being coupled to said static magnetic memory means to store in said static magnetic memory means in parallel individual digital signals from said sensing device and said rectifying means, electronic distributing means responsive to said timing pulse generating means and coupled to said static magnetic memory means for reading out serially the individual digital signals stored therein, a second commutating means having a plurality of output channels and responsive to said serial signals from said first static magnetic memory, a code conversion means having a plurality of channels, switching means for selectively coupling (1) said second commutating means to said recording means, and (2) said play back means to said code conversion means, and a tape recording mechanism coupled to said code conversion means.

4. In a data translating system having means for simultaneously sensing like digits of characters encoded on perforated record cards, a system for rearranging and supplementing the data on said cards comprising means providing conductive paths in parallel coupled to said sensing means, each of said paths being associated with one of said characters, extra character generating means having a plurality of conductive paths each associated with an individual character, said character generating means being coupled to said sensing means and providing desired digital signals in said paths coincident in time with the sensing of corresponding digits on said perforated cards, means for rearranging said conductive path providing means from said conductive paths in parallel and said extra signal generating means, means coupled to said rearranging means for storing in parallel signals on said conductive paths, means for reading out said stored signals serially, a synchronous means for storing the serially read signals of like digits in adjacent channels, whereby the digits of an individual character are disposed in parallel, and multi-channel means coupled to said synchronous means for playing back the digits of individual characters simultaneously.

5. In a data translating system having means for simultaneously sensing like digits of characters encoded on perforated record cards, a system for rearranging and supplementing the data on said cards comprising a plurality of conductors coupled to said sensing means, each of said conductors being individual to one of said characters, extra character generating means having a plurality of output conductors each individual to an extra character, said extra character generating means being coupled to said sensing means and providing desired digital signals in said output conductors coincident in time with the sensing of corresponding digits on said perforated cards, a plugboard coupled to said plurality of conductors and to said plurality of output conductors for selectively rearranging said conductors, a static magnetic memory coupled to said plugboard for storing in parallel signals on said conductors, a synchronous means for storing serial signals, means coupled to said synchronous means and said static magnetic memory for reading out serially the signals stored in said static magnetic memory to store the serially read signals of like digits in adjacent channels, whereby the digits of an individual character are disposed in parallel, and multi-channel means coupled to said synchronous means for playing back the digits of individual characters simultaneously.

6. In a data translating system having means for simultaneously sensing like digits of characters encoded on perforated Hollerith type cards, a system for rearranging and supplementing the data on said cards comprising a plurality of conductors coupled to said sensing means, each of said conductors being individual to one of said characters, extra character generating means having a plurality of output conductors each individual to an extra character, said extra character generating means being coupled to said sensing means and providing desired digital signals in said output conductors coincident in time with the sensing of corresponding digits on said cards, a plugboard coupled to said plurality of conductors and to said plurality of output conductors for selectively rearranging said conductors, a static magnetic memory coupled to said plugboard for storing in parallel signals on said conductors, a magnetic drum storage coupled to said static magnetic memory, a timing pulse generator coupled to said magnetic drum storage, an electronic distributor coupled to said timing pulse generator and said static magnetic memory for reading out serially the signals stored in said static memory to store the serially read signals of like digits in adjacent channels on said drum, whereby the digits of an individual character are disposed in parallel on said drum, and means coupled to said magnetic drum storage for playing back the digits of individual characters simultaneously.

7. A system for sensing characters encoded in digital perforation positions disposed in parallel rows on Hollerith type cards, and for converting the encoded characters to a different code, said system comprising a first means for analyzing individual rows of said perforation positions, a first means responsive to said first analyzing means for storing in parallel the digital values in said individual rows, a second means for analyzing individual rows of said perforation positions, a second means responsive to said second analyzing means for storing in parallel the digital values in said individual rows, synchronous means coupled to said first storage means for recording said digital values serially with digits of an individual character disposed in parallel, means coupled to said synchronous means and to said second storage means for reading out a row of stored digital values from said synchronous means simultaneously with a row of stored digital values from said second storage, means responsive to both said simultaneously read rows for comparing said digital values, and means responsive to the parallel digital values of individual characters on said synchronous means for converting said digital values to a different code.

8. A system for sensing characters encoded in digital perforation positions disposed in parallel rows on Hollerith type cards, and for converting the encoded characters to a different code, said system comprising a first means for analyzing individual rows of said perforation positions, a first means responsive to said first analyzing means for storing in parallel the digital values in said individual rows, a second means for analyzing individual rows of said perforation positions, a second means responsive to said second analyzing means for storing in parallel the digital values in said individual rows, drum storage means including translating head means coupled to said first storage means for recording said digital values serially with digits of an individual character disposed in parallel, electronic distributor means coupled to said drum storage means and to said second storage means for reading out a row of stored digital values from said drum storage means simultaneously with a row of stored digital values from said second storage, means responsive to both said simultaneously read rows for comparing digital values, and means responsive to the parallel digital values of individual characters on said drum storage means for converting said digital values to a different code.

9. A system for sensing characters encoded in digital perforation positions disposed in parallel rows on Hollerith type cards, and for converting the encoded characters to a different code, said system comprising a first means for analyzing individual rows of said perforation positions, a first static magnetic memory responsive to said first analyzing means for storing in parallel the digital values in said individual rows, a second means for analyzing individual rows of said perforation positions, a second static magnetic memory responsive to said second analyzing means for storing in parallel the digital values in said individual rows, drum storage means including first and second translating heads, means selectively coupling said first static magnetic memory to said first and second translating heads, means selectively coupling said second static magnetic memory to said first and second translating heads, timing pulse generating means coupled to said drum storage means and to (1) said first static magnetic memory for recording the digital values on said first memory serially on said drum storage means with digits of an individual character disposed in parallel and (2) said second static magnetic memory for reading out a row of stored digital values from said drum storage means simultaneously with a row of stored digital values from said second static magnetic memory, a comparator responsive to both said simultaneously read rows of stored digital values, and a code translator responsive to the parallel digital values of individual characters on said drum storage means.

10. A system for translating characters having a plurality of digital positions from a first data storage medium to a second data storage medium, and for verifying the characters so translated, said system comprising first and second means for sensing like digital positions of said characters to provide first and second sets of digital signals in parallel, first and second static magnetic memory means responsive to said first and second sets of digital signals respectively, for storing each of said sets of digital signals in parallel, means coupling said first and second sensing means to said first and second memory means for selectively rearranging each of said sets of signals, a synchronous means for storing signals, means coupling said synchronous storage means and said first and second static magnetic memory means for reading out serially said signals stored in parallel, means coupled to said serial read-out means and said first static magnetic memory means for recording said serial signals on said synchronous storage means with the digits of an individual character grouped in parallel, means coupled to said synchronous storage means for playing back the serial signals on said synchronous storage means in synchronization with the serial read-out of said second static magnetic memory means, means for comparing said played back signals from said synchronous storage means to the serial signals read-out of said second static magnetic memory means, means coupled to said synchronous storage means for playing back said characters stored in parallel, code conversion means coupled to said play back means, and means coupled to said code conversion means for recording on said second data storage medium.

11. A system for (1) sensing data encoded in a coordinate array of digital perforation positions on a statistical card wherein individual positions in a first coordinate direction denote individual characters and individual positions in a second coordinate direction denote like digital positions of said individual characters, (2) adding further characters to the sensed data, (3) rearranging the order of the sensed data and added characters, (4) verifying the rearranged data, (5) converting the rearranged data to a binary code, and (6) recording the converted data on a magnetic medium, said system comprising a first sensing device for simultaneously sensing like digital perforation positions of said individual characters, a second sensing device for subsequently again simultaneously sensing like digital perforation position of said individual characters, a first commutating means coupled to said sensing devices for selecting digital positions corresponding to the digital perforation positions of said individual characters, rectifying means coupled to said first commutating means at the selected digital positions for selectively supplying signals corresponding to digital values of preselected characters, a first plugboard rearranging means coupled to said first sensing device and said rectifying means, a second plugboard rearranging means coupled to said second sensing device and said rectifying means, a first static magnetic memory means coupled to said first rearranging means and responsive through said first rearranging means to the sensed perforations at said first sensing device and to the signals from said rectifying means, a second static magnetic memory means coupled to said second rearranging means and responsive through said second rearranging means to the sensed perforations at said second sensing device and to the signals from said rectifying means, a rotatable magnetic drum storage device, first and second recording and play back means having a plurality of channels operatively associated with said drum storage device, pulse generator means coupled to said drum storage device for providing a plurality of timing pulses and an index pulse, an index pulse selector responsive to said pulse generator means, said index pulse selector being coupled to said first and second static magnetic memory means to store in said first and second memory means in parallel individual digital signals from said first sensing device and said rectifying means, and from said second sensing device and said rectifying means, respectively, electronic distributing means responsive to said timing pulse generating means and coupled to said first and second static magnetic memory means for reading out serially the individual digital signals stored therein, a second commutating means having a plurality of output channels, said second commutating means being coupled to said drum storage device and being responsive to said serial signals from said first static magnetic memory, a first switching means for selectively coupling individual output channels of said second commutating means to individual channels of said first and second recording means, a third commutating means having a plurality of input channels and a common conductor output, said third commutating means being coupled to said drum storage device, a second switching means for selectively coupling individual input channels of said third commutating means to individual channels of said first and second play back means, comparator means responsive to signals from said second static magnetic memory means and said third commutating means, a code conversion means coupled to said second switching means, said code conversion means having a plurality of channels each selectively coupled to an individual channel of said first and second means through said second switching means, and a tape recording mechanism coupled to said code conversion means.

12. The invention as set forth in claim 11, wherein said first, second, and third commutating means include idle segments whereby a delay period is provided for feeding cards.

13. In a data translating system having means for simultaneously sensing like digital positions of a plurality of individual characters encoded in perforated patterns in a record card, a system for generating supplementary characters comprising commutating means having a common input conductor and a plurality of output channels, said commutating means being coupled to said sensing means, means providing a plurality of conductive paths, each individual to a supplementary character, and rectifying means selectively coupling at least one output channel of said commutating means to individual ones of said conductive paths.

14. In a data translating system having means for simultaneously sensing like digital positions of a plurality of individual characters encoded in perforated patterns in a record card, a system for generating supplementary characters in separate paths comprising rotary commutating means having a common input conductor and a plurality of commutator segments, said rotary commutator means being coupled to said sensing means and providing a coupling between an individual commutator segment and said common input conductor individual to each digital position on said record card, a plurality of conductive paths, each of said paths being individual to a supplementary character, and rectifying means selectively coupling at least one of said commutator segments to individual ones of said conductive paths.

15. A system for translating characters having a plurality of digital positions from a first data storage medium to a second data storage medium comprising means for sensing information from like digital positions of characters stored in said first medium, magnetic memory means, means coupled to said sensing means and said memory means for storing the said information from said like digital positions in parallel in said memory means, means coupled to said memory means for reading out all the digital positions of individual characters simultaneously, code conversion means responsive to characters thus read out of said magnetic memory means, and means responsive to said code conversion means for recording on said second data storage medium.

16. A system for translating characters having a plurality of digital positions from a first data storage medium to a second data storage medium comprising means for sensing information from like digital positions of characters stored in said first medium to provide character digital signals in parallel, means coupled to said sensing means for adding character digital signals to said sensed character digital signals, like digital positions of the added characters being in parallel with like digital positions of said sensed characters, means for rearranging the order of said parallel sensed and added character digital signals, means coupled to said rearranging means for storing in parallel the signals from like digital positions of said digital character signals, means coupled to said storing means for simultaneously reading out the character digital signals of individual characters, code conversion means responsive to the thus read out characters, and means responsive to said code conversion means for recording on said second data storage medium.

17. In a data translating system having means for simultaneously sensing like digits of characters, encoded on perforated record cards, a system for rearranging and supplementing the data on said cards comprising means providing conductive paths in parallel coupled to said sensing means, each of said paths being associated with one of said characters, extra character generating means having a plurality of conductive paths each associated with an individual character, said character generating means being coupled to said sensing means and providing desired digital signals in said paths coincident in time with the sensing of corresponding digits on said perforated cards, means for rearranging said conductive paths from said conductive paths in parallel and said extra signal generating means, means coupled to said rearranging means for storing in parallel signals on said conductive paths, and means coupled to said means for storing for reading out the values of individual digits simultaneously.

18. A system for translating characters having a plurality of digital positions from a first data storage medium to a second data storage medium and for verifying the translating process, said system comprising a first means for analyzing information from like digital positions of said characters stored in said first data storage medium, a first storage means responsive to said first analyzing means for storing in parallel the values at the like digital positions, a second means for again analyzing information from like digital positions of said characters stored in said first data storage medium, a second storage means responsive to said second analyzing means for again storing in parallel the values at the like digital positions, means coupled to said first and second storage means for reading out serially from each of said storage means the values of like digital positions stored in parallel, means for comparing the serially read out digital values, means coupled to said first storage means for reading out said characters serially, and means responsive to said serially read out characters for recording on said second data storage medium.

No references cited.